United States Patent
Shete et al.

(10) Patent No.: US 11,775,373 B2
(45) Date of Patent: Oct. 3, 2023

(54) SYSTEM FOR DECIPHERING AND UNBLOCKING OF APPLICATIONS

(71) Applicant: BANK OF AMERICA CORPORATION, Charlotte, NC (US)

(72) Inventors: Abhinay Tukaram Shete, Plainsboro, NJ (US); Pankaj Dhannalal Dahat, Plainsboro, NJ (US); Rahul Ramesh Dixit, Ewing, NJ (US); Suyog Subhash Gambhirrao, Ewing, NJ (US); Anish Wilson Maliackal, Ewing, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 874 days.

(21) Appl. No.: 16/443,074

(22) Filed: Jun. 17, 2019

(65) Prior Publication Data
US 2020/0394097 A1 Dec. 17, 2020

(51) Int. Cl.
*G06F 11/00* (2006.01)
*G06F 11/07* (2006.01)
(Continued)

(52) U.S. Cl.
CPC ...... *G06F 11/0784* (2013.01); *G06F 11/0706* (2013.01); *G06F 11/0775* (2013.01);
(Continued)

(58) Field of Classification Search
CPC .............. G06F 11/0706; G06F 11/0775; G06F 11/0784; G06F 11/0787; G06F 11/079;
(Continued)

(56) References Cited

U.S. PATENT DOCUMENTS

| 7,966,664 B2 * | 6/2011 | Makkinejad | G06F 21/629 |
| | | | 726/26 |
| 2016/0019134 A1 * | 1/2016 | Periyasamy | G06F 11/3664 |
| | | | 714/38.1 |

(Continued)

OTHER PUBLICATIONS

Lee, Adam J., Parisa Tabriz, and Nikita Borisov. "A privacy-preserving interdomain audit framework." In Proceedings of the 5th ACM workshop on Privacy in electronic society, pp. 99-108. 2006. (Year: 2006).*

(Continued)

*Primary Examiner* — Anthony J Amoroso
(74) *Attorney, Agent, or Firm* — Moore & Van Allen PLLC; Nicholas C. Russell (57) ABSTRACT

Embodiments of the invention are directed to a system, method, or computer program product for deciphering and unblocking applications in error in real-time. The invention creates, maintains, and continuously updates a back-end database with a rules depository for providing alternative routes for error obfuscation via machine learning and historic action logs. The appropriate alternate route is determined based on workflow and coding. The system integrates a user facing virtual system to provide an assistant launcher in application alerts. In case of failed operations, the user facing virtual system launches in integration with the invention for knowledgeably reiteration of details of the error based on launch point after failure. The system may decipher the error code, provide an alternative resolution path to the user, and execute the flow by assisting the user via the user facing virtual system.

18 Claims, 7 Drawing Sheets

(51) Int. Cl.
*H04L 9/06* (2006.01)
*G06N 5/025* (2023.01)
*G06F 11/32* (2006.01)

(52) U.S. Cl.
CPC ...... *G06F 11/0787* (2013.01); *G06F 11/0793* (2013.01); *G06F 11/327* (2013.01); *G06N 5/025* (2013.01); *H04L 9/0618* (2013.01)

(58) Field of Classification Search
CPC ..... G06F 11/0793; G06F 11/327; G06N 5/00; G06N 5/02; G06N 5/025; G06N 5/046; G06N 20/00; G06N 20/20; H04L 9/0618
See application file for complete search history.

(56) References Cited

U.S. PATENT DOCUMENTS

2018/0336479 A1* 11/2018 Guttmann ............ G06V 10/764
2019/0317850 A1* 10/2019 Chau ........................ G06F 8/61

OTHER PUBLICATIONS

Xu, Hui, Yangfan Zhou, Yu Kang, and Michael R. Lyu. "On secure and usable program obfuscation: A survey." arXiv preprint arXiv:1710.01139 (2017). (Year: 2017).*

* cited by examiner

SYSTEM FOR DECIPHERING AND UNBLOCKING OF APPLICATIONS

BACKGROUND

In the technology landscapes, users regularly access entity applications to perform functions associated with the entity. That being said, errors still occur in entity applications that disrupt user interaction and processing within the application. As such, there exists a need for an in line system for deciphering and unblocking of applications.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

In some embodiments, the invention provides a system for deciphering and unblocking of entity applications and error associated with entity applications. When user access entity application for performing resource distributions, viewing resource distribution history, updating resource information, or the like via the entity application, sometimes an issue may arise. These issues may be technical or environmental and lead to an error message indicator being presented. At that point, the user is not typically provided with any deciphering or unblocking tactics. Instead, a behind the scene rules for each of one or more error messages presented to the user will not provide the user with any idea of why the error occurred or what the error was. As such, the user would be forced to re-initiate the application start up or perform another function.

The system may associate with the backend of the application and be able to identify the reasons for an error message presentment to a user. The system may then be able to leverage a user facing application or virtual system and integration into the user facing application to provide the user with an alternate right to perform the function and obfuscate the error. The system does not provide a generic message, the system provides and end-to-end tool for analysis of the user's login session and identification of the specific error. As such, the system may provide, via the virtual system, a specific, step-by-step alternate route for the user to complete a task.

The system may include a back-end database with a rules depository that provides all alternate routes. The appropriate alternate route is determined based on the workflow. The system may generate the rules depository based on artificial intelligence and machine learning that identifies entity and user historic actions performed when a specific error was triggered.

Embodiments of the present invention address these and/or other needs by providing an innovative system, method and computer program product for deciphering and unblocking of applications, the invention comprising: identifying an error presentation to a user while the user is performing an action on an entity application, wherein the error presentation is an indication of a technical error occurring and wherein the error presentation is presented to the user via a user device; identifying the technical error associated with the error presentation; extracting alternative approach from a rules depository that matches the technical error associated with the error presentation, wherein the alternative approach is a step by step process for the user to implement for error obfuscation; transmitting the extracted alternative approach to a user facing virtual system; displaying the alternative approach to the user via invasion and display on the user device; and providing real-time step by step processing to the user via the alternative approach for error obfuscation in real-time during the action on the entity application.

In some embodiments, the invention further comprises a drop in multi-channel tool that executes on top of an underlying cloud base analytic rule engine for providing the alternative approach for error obfuscation.

In some embodiments, the rules depository further comprises a searchable inventory of step by step alternative routes for each technical error associated with the entity application.

In some embodiments, the alternative routes are generated based on artificial intelligence and machine learning that identifies potential technical errors and the alternative routes are generated based on entity and user historic actions performed when faces with the error presentation.

In some embodiments, identifying the error presentation further comprises extracting an error log associated with the technical error and extracting a user activity log leading up to the error presentation to the user.

In some embodiments, identifying the error presentation further comprises identifying a generic error presentation and performing back end processing analysis to identify a technical rational for the error to further identify the technical error associated with the generic error presentation.

In some embodiments, the user facing virtual system further comprises accessing the user device and displaying audibly and virtually a step by step process for error obfuscation.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

A "user" as used herein may refer to any customer of an entity or individual that interacts with an entity. The user may interact with an entity as a customer, such as a customer purchasing a product or service. Furthermore, as used herein the term "user device" or "mobile device" may refer to mobile phones, personal computing devices, tablet computers, wearable devices, and/or any portable electronic device capable of receiving and/or storing data therein.

As used herein, a "user interface" generally includes a plurality of interface devices and/or software that allow a customer to input commands and data to direct the processing device to execute instructions. For example, the user interface may include a graphical user interface (GUI) or an interface to input computer-executable instructions that direct the processing device to carry out specific functions. Input and output devices may include a display, mouse, keyboard, button, touchpad, touch screen, microphone, speaker, LED, light, joystick, switch, buzzer, bell, and/or other user input/output device for communicating with one or more users.

A "technology activity" may include a transaction for a product or service from a merchant. A "transaction" or "resource distribution" refers to any communication between a user and an entity to transfer funds for the purchasing or selling of a product or service. A transaction may refer to a purchase of goods or services, a return of goods or services, a payment transaction, a credit transaction, or other interaction involving a user's account. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

Further, the term "payment credential" or "payment vehicle," as used herein, may refer to any of, but is not limited to refers to any of, but is not limited to, a physical, electronic (e.g., digital), or virtual transaction vehicle that can be used to transfer money, make a payment (for a service or good), withdraw money, redeem or use loyalty points, use or redeem coupons, gain access to physical or virtual resources, and similar or related transactions. For example, in some embodiments, the payment vehicle is a bank card issued by a bank which a customer may use to perform purchase transactions. However, in other embodiments, the payment vehicle is a virtual debit card housed in a mobile device of the customer, which can be used to electronically interact with an ATM or the like to perform financial transactions. Thus, it will be understood that the payment vehicle can be embodied as an apparatus (e.g., a physical card, a mobile device, or the like), or as a virtual transaction mechanism (e.g., a digital transaction device, digital wallet, a virtual display of a transaction device, or the like). The payment vehicle may be an unrestricted resource. Unrestricted resources, as used herein may be any resource that is not restricted for transaction. In this way, the unrestricted resources may be applied to any transaction for purchase of a product or service.

When users access entity application for performing resource distributions, viewing resource distribution history, updating resource information, or the like via the entity application, sometimes an issue may arise. These issues may be technical or environmental and lead to an error message indicator being presented. At that point, the user is not typically provided with any deciphering or unblocking tactics. Instead, a behind the scene rules for each of one or more error messages presented to the user will not provide the user with any idea of why the error occurred or what the error was. As such, the user would be forced to re-initiate the application start up or perform another function.

Currently, when a user is navigating an entity application and an error occurs, such as a technical, environmental, or the like type of error the user is presented with a generic error message that is not helpful for identification of the type of error. Depending on the point of navigation within the entity application, the user may have to connect with an associate at the entity or the like. The system intercepts the error, identifies the error, and utilizes historic data and machine learning to generate and deploy an alternative path for user obfuscation of the error. The system integrates with a user facing virtual system to provide an instant assistant to help the user in case of failures to cure or work around the error, unblocking the user with a real-time resolution.

The system may associate with the back-end of the application and be able to identify the reasons for an error message presentment to a user. The system may then be able to leverage a user facing application or virtual system and integration into the user facing application to provide the user with an alternate right to perform the function and obfuscate the error. The system does not provide a generic message, the system provides and end-to-end tool for analysis of the user's login session and identification of the specific error. As such, the system may provide, via the virtual system, a specific, step-by-step alternate route for the user to complete a task.

The system may include a back-end database with a rules depository that provides all alternate routes. The appropriate alternate route is determined based on the workflow. The system may generate the rules depository based on artificial intelligence and machine learning that identifies entity and user historic actions performed when a specific error was triggered.

In some embodiments, the system is triggered when a user gets an error when navigating or interacting with an entity application. The system provides the user with real-time solutions to circumvent the error being faced at that moment or flow in the application navigation process. The system executes based on user behavior and cloud based error deciphering analytics to provide a real-time solution or alternate route to mitigate the issue for the user. The system provides a drop in multi-channel tool that executes on the top of an underlying cloud base analytic rule engine.

In some embodiments, as a high level implementation, the system builds a data repository or rules depository for all error scenarios based on business rules and work flows. The system integrates a user facing virtual system to provide an assistant launcher in application alerts. In case of failed operations, the user will see an option for launching the user facing virtual system to guide the user through the error. The user facing virtual system will knowledgeably reiterate details about the recent failure based on launch point after failure. The user facing virtual system may provide the details via text, audio, or the like via the user device. The system may decipher the error code, provide an alternative resolution path to the user, and execute the flow by assisting the user via the user facing virtual system.

Figure 1:
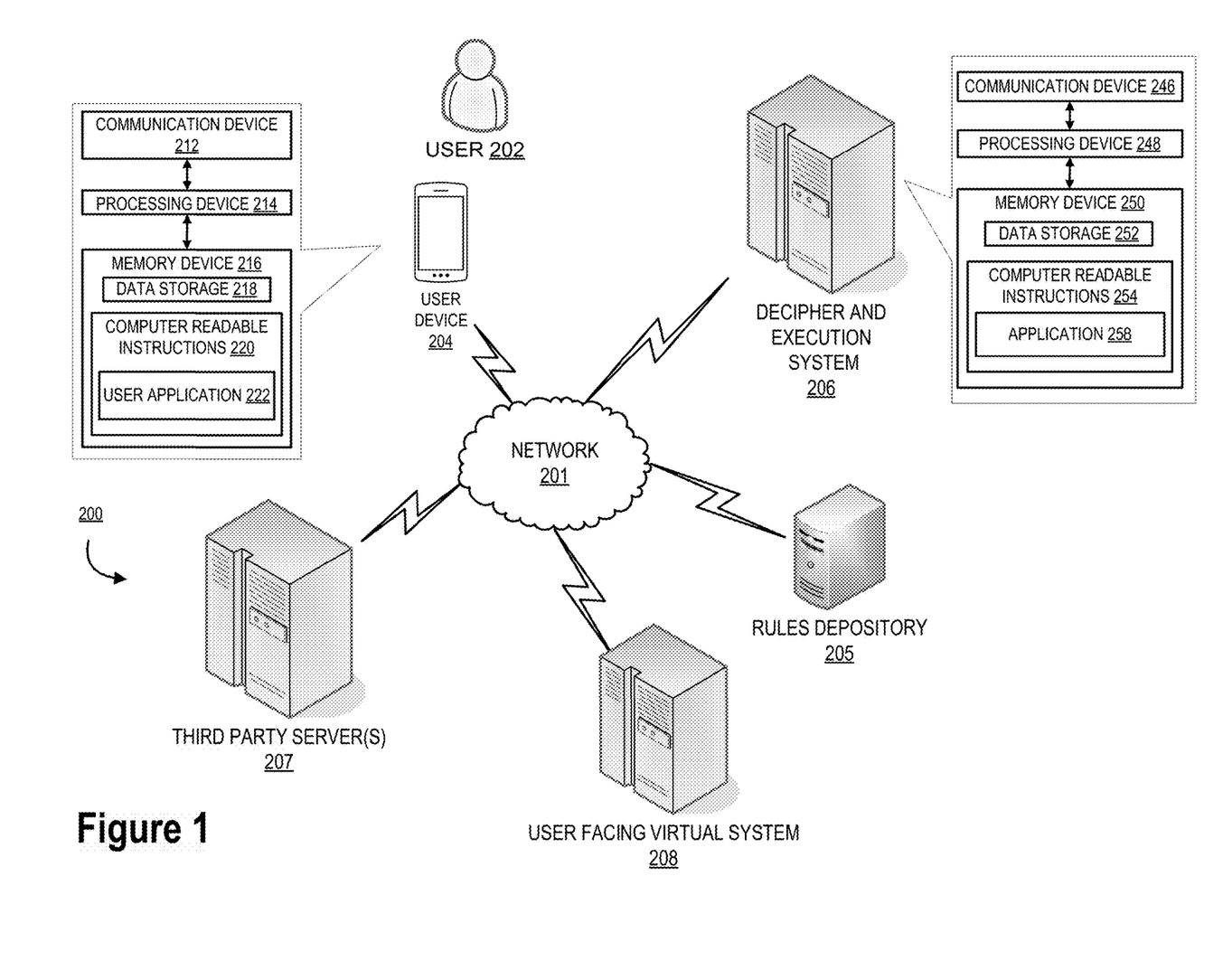
FIG. 1 provides a deciphering and unblocking system environment, in accordance with one embodiment of the present invention.

FIG. 1 provides a deciphering and unblocking system environment 200, in accordance with one embodiment of the present invention. FIG. 1 provides the system environment 200 for which the distributive network system with specialized data feeds associated with an interconnected resource distribution and retention network. FIG. 1 provides a unique system that includes specialized servers and system communicably linked across a distributive network of nodes required to perform the functions described herein. In some embodiments, the invention converts, in real-time, accumulated digitally stored auxiliary resources via real-time transformation, into unrestricted resources for utilization in a technology activity.

As illustrated in FIG. 1, the user facing virtual system 208 is operatively coupled, via a network 201 to the user device 204, rules depository 205, third party servers 207, and to the decipher and execution system 206. In this way, the user facing virtual system 208 can send information to and receive information from the user device 204, rules depository 205, third party servers 207, and the decipher and execution system 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual or entity that has one or more user devices 204 and is a customer of an entity and is interacting with an entity application. In some embodiments, the user 202 has a user device, such as a mobile phone, tablet, computer, or the like. FIG. 1 also illustrates a user device 204. The user device 204 may be, for example, a desktop personal computer, business computer, business system, business server, business network, a mobile system, such as a cellular phone, smart phone, personal data assistant (PDA), laptop, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the decipher and execution system 206, the user facing virtual system 208, and the third party sever 207. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222. In some embodiments, the user application 222 allows a user 202 to send and receive communications with the decipher and execution system 206.

As further illustrated in FIG. 1, the decipher and execution system 206 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the user facing virtual system 208, the third party server 207, the rules depository 205, and the user device 204. As such, the communication device 246 generally comprises a modem, server, or other device for communicating with other devices on the network 201.

As further illustrated in FIG. 1, the decipher and execution system 206 comprises computer-readable instructions 254 stored in the memory device 250, which in one embodiment includes the computer-readable instructions 254 of an application 258. In some embodiments, the memory device 250 includes data storage 252 for storing data related to the system environment 200, but not limited to data created and/or used by the application 258.

In one embodiment of the decipher and execution system 206 the memory device 250 stores an application 258. In one embodiment of the invention, the application 258 may associate with applications having computer-executable program code. Furthermore, the decipher and execution system 206, using the processing device 248 codes certain communication functions described herein. In one embodiment, the computer-executable program code of an application associated with the application 258 may also instruct the processing device 248 to perform certain logic, data processing, and data storing functions of the application. The processing device 248 is configured to use the communication device 246 to communicate with and ascertain data from one or more user facing virtual system 208, third party servers 207, rules depository 205, and/or user device 204.

As illustrated in FIG. 1, the third party server 207 is connected to the user facing virtual system 208, user device 204, rules depository 205, and decipher and execution system 206. The third party server 207 has the same or similar components as described above with respect to the user device 204 and the decipher and execution system 206. While only one third party server 207 is illustrated in FIG. 1, it is understood that multiple third party servers 207 may make up the system environment 200. The third party server 207 may be associated with one or more financial institutions, entities, or the like.

As illustrated in FIG. 1, the rules depository 205 is connected to the user facing virtual system 208, user device 204, third party server 207, and decipher and execution system 206. The rules depository 205 has the same or similar components as described above with respect to the user device 204 and the decipher and execution system 206. While only one rules depository 205 is illustrated in FIG. 1, it is understood that multiple rules depository 205 may make up the system environment 200.

The rules depository 205 stores rules for completion and obfuscation of an error presented to the user via an entity application. In this way, the rules depository 205 may store step by step instructions for overcoming any technical error that may occur on the entity application. In some embodiments, the error obfuscation steps may be identified using decipher and execution system 206 artificial intelligence and machine learning scanning of all usage of the entity application. In some embodiments, the error obfuscation steps may be identified based on user historic actions for error obfuscation.

The rules depository 205 may be connected to the decipher and executions system 206 via the network 201 for the decipher and execution system 206 to perform a search of the rules depository 205 for identification of the specific rules for overcoming a specific technical error. Furthermore, the rules depository 205 may communicate with the same network protocol and compatibility with the user facing virtual system 208 for deployment of the rules to the user 202 via user facing virtual system 208 deployment of the rules on the user device 204.

As illustrated in FIG. 1, the user facing virtual system 208 is connected to the third party server 207, user device 204, rules depository 205, and decipher and execution system 206. The user facing virtual system 208 may be associated with the decipher and execution system 206. The user facing virtual system 208 has the same or similar components as described above with respect to the user device 204 and the decipher and execution system 206. While only one user facing virtual system 208 is illustrated in FIG. 1, it is understood that multiple user facing virtual system 208 may make up the system environment 200. It is understood that the servers, systems, and devices described herein illustrate one embodiment of the invention. It is further understood that one or more of the servers, systems, and devices can be combined in other embodiments and still function in the same or similar way as the embodiments described herein. The user facing virtual system 208 may generally include a processing device communicably coupled to devices as a memory device, output devices, input devices, a network interface, a power source, one or more chips, and the like. The user facing virtual system 208 may also include a memory device operatively coupled to the processing device. As used herein, memory may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the user facing virtual system 208 described herein.

The user facing virtual system 208 furthermore provides for establishing intelligent, proactive and responsive communication with a user, comprising a multi-channel cognitive resource platform for performing electronic activities in an integrated manner from a single interface. The user facing virtual system 208 is also configured for adapting to the user's natural communication and its various modes by allowing seamless switching between communication channels/mediums in real time or near real time"

The user facing virtual system 208 features include: User Interface Navigation and Activity Implementation, Cognitive, Intuitive and Anticipatory features and Electronic activity integration features.

The user facing virtual system 208 is configured to receive, recognize and interpret these linguistic phenomena of the user input and perform user activities accordingly. In this regard, the user facing virtual system 208 is configured for natural language processing and computational linguistics. Based on analyzing the received activity input, the user facing virtual system 208 is configured to determine the user activity that the user seeks to perform. Here, in general, the user facing virtual system 208 may parse the activity input from the user to detect one or more words that make up the activity input from the user. The user facing virtual system 208 may then analyze words to determine the user activity. For example, the user facing virtual system 208 may receive the following voice activity input from the user: "Pay my utility bill of February month." The user facing virtual system 208 may then analyze the one or more words to determine that the caller wants to pay a bill, for example, based on identifying keywords such as, "pay" and "bill". The user facing virtual system 208 may then proceed to perform the bill payment through the central user interface.

Specifically, based on receiving the activity input from the user, in some instances, the user facing virtual system 208 is configured to generate a parse tree based on detected one or more words and/or the detected keywords. A parse tree is a data structure that allows the user facing virtual system 208 to accurately analyze activity input. For example, the parse tree may indicate the various language structures, such as clauses, phrases, subjects, verbs, and objects in a spoken statement and identify the words in each language structure. The user facing virtual system 208 may analyze the parse tree to determine the user activity to be performed and the intent of the user and also to determine any parameters provided by the user for an invoked service. The user facing virtual system 208 may invoke another application, a service, an activity functionality and the like based on its analysis of parse tree.

The user facing virtual system 208 is configured for initiate presentation of a central user interface of the multi-channel cognitive resource application stored on the user device. The user facing virtual system 208 may receive user input. For example, this input may be received via an audio communication channel and/or a textual communication channel. The user facing virtual system 208 may be configured to interpret and transform, seamlessly and in real-time, one medium to another for presentation on the central user interface (for example, speech to text, text to speech and the like). The user facing virtual system 208 may present the received activity input from the user in a textual format. The user facing virtual system 208 may similarly respond to the user input, as indicated by the output, in natural language. In addition, the user facing virtual system 208 may present one or more interactive elements for facilitating the activity, which are embedded, integrated into, or overlaid over the central user interface. These interactive elements may be actuated by tactile input (touch commands and other gestures), audio commands or textual input from the user. These interactive elements may be extracted from other pertinent applications, such as resource applications, discussed previously.

In addition, the user facing virtual system 208 is intuitive and is configured to hold complex and branched conversations with the user, in the pursuit of completing one or more user activities. In this regard, the user facing virtual system 208 is configured to detect and conduct branched conversations using intelligent complex path looping. In some instances, the user facing virtual system 208 may identify a suitable conversation path for completion of a user initiated activity, and proceed to request information accordingly. For example, for a user activity of making reservations at a restaurant, the user facing virtual system 208 may determine a conversation path comprising requesting the cuisine of the restaurant, presenting one or more restaurants associated with the cuisine located in the user's vicinity, receiving a selection of a particular restaurant, receiving a time for the reservation and the number of people for the reservation, and the like. Subsequently, the user facing virtual system 208 may automatically make reservations for the user at the chosen restaurant. These conversation paths are typically natural language conversational forms of the user activity events described previously, and may be determined by the user facing virtual system 208, after or in conjunction with determining the one or more discrete activity events.

In addition, the intelligent complex path looping of the invention enables the user facing virtual system 208 to loop back to the original conversation path for completion of the activity in the instances where the user digresses or the conversation branches out.

Furthermore, the user facing virtual system 208 may include an enhanced resource sharing management application, is configured to function as an intelligent personal assistant and resource navigator and is configured to perform one or more resource activities by harnessing the functionality of multiple applications resident on the user device, for example, functionality of a resource sharing application and another resource activity application may be proactively provided on a single interface, for example, via interfaces overlaid over each other.

Here, in some instances, the central user interface is a computer human interface, and specifically a natural language user interface for receiving user input (for example, for creating, selecting and modifying data/functionality), presenting information regarding user activities, providing output to the user, and otherwise communicating with the user in a natural language of the user. The natural language of the user comprise linguistic phenomena such as verbs, phrases and clauses that are associated with the natural language of the user. The user facing virtual system 208 is configured to receive, recognize and interpret these linguistic phenomena of the user input and perform user activities accordingly. In this regard, the user facing virtual system 208 is configured for natural language processing and computational linguistics. In many instances, the user facing virtual system 208 is intuitive, and is configured to anticipate user requirements, data required for a particular activity and the like, and request activity data from the user accordingly.

In particular, the user facing virtual system 208 is configured to present an integrated central user interface for communicating with the user using audio, visual, and/or textual natural speech conversations with the user, for execution of one or more user activities such as resource sharing and allocation, communicating and performing associated resource activities and functions, and for integrating the functionality of multiple applications (e.g., a resource sharing application such as a resource availability/surplus identification and allocation application for renting dwellings, and a resource activity application such as a financial application, an offer application and/or a personal assistant application) in a single interface, without requiring the user to access the multiple applications individually and be proficient in their operation.

The personal digital assistant feature of system is intuitive and is configured to hold complex and branched conversations with the user, in the pursuit of completing one or more resource activities. In this regard, the user facing virtual system 208 is configured to detect and conduct branched conversations using intelligent complex path looping. In some instances, the user facing virtual system 208 may identify a suitable conversation path for completion of a user initiated activity, and proceed to request information accordingly.

In some embodiments, the system may provide a new payment vehicle to the user, for example, a credit card to the digital wallet of the user, in near real time to facilitate the payment transaction. For example, the system may provide a new payment vehicle suitable for the geographic region that the user is travelling to, a vehicle that provides certain rebates and the like. In some embodiments, the system provides foreign exchange services to facilitate overseas payments.

Finally, the user facing virtual system 208 may perform instructions provided by the decipher and execution system 206 and the rules depository 205 in order to provide user facing instructions to the user for error identification and obfuscation via alternative path presentment. The user facing virtual system 208 may integrate within the user device 204 and provide visual, audible, textual, or the like instructions for error obfuscation and reconciliation in real-time.

Figure 2:
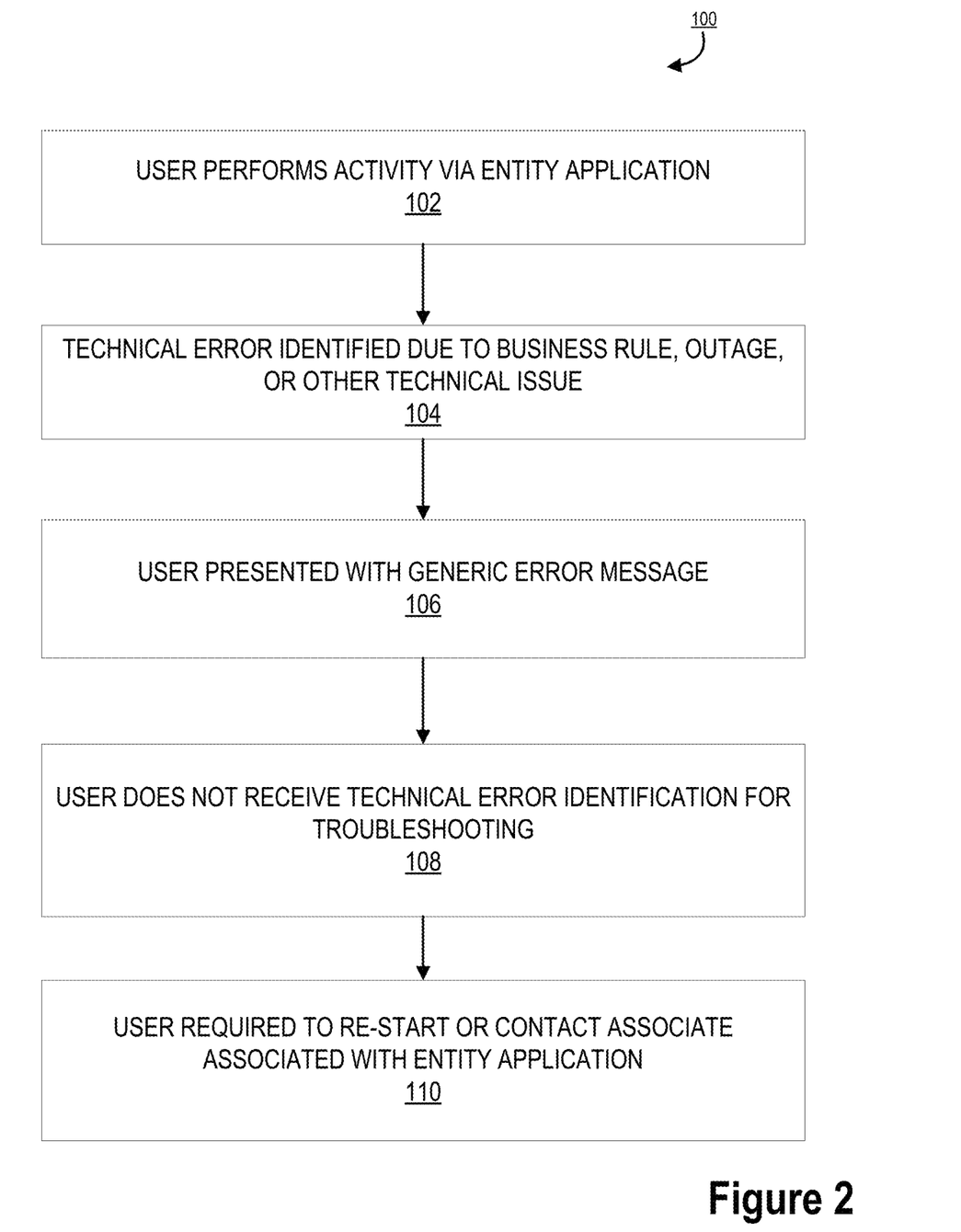
FIG. 2 provides a high level process flow illustrating current error triggering and action processing, in accordance with one embodiment of the present invention.

FIG. 2 provides a high level process flow illustrating current error triggering and action processing 100, in accordance with one embodiment of the present invention. In some embodiments, FIG. 2 illustrates a current state without application of the system for deciphering and unblocking of applications being deployed. As illustrated in block 102, the process 100 is initiated by the user performing activities via an entity application. These activities could be shopping, trading, account reviewing, performing transactions, communicating, reviewing information, or the like on an entity application. The user may be performing these actions via a user device or other device connected to a network. The entity application maybe one or more software applications for display on a user device.

As illustrated in block 104, a technical error may be triggered during the user activity on the entity device. The technical error may be due to a business rule, an outage, a delay, an entity side server delay, a network issue, a user device issue, or another technical issue arising with the deployment and utilization of the entity application.

As illustrated in block 106, the process 100 continues by presenting an error message to the user via a user display while the user is preforming activities on the entity application. Typically, the error message is a generic error message that does not provide the user with an indication as to the technical aspect that caused the error. As such, the use does not know the reasons for the error. As illustrated in block 108, the user does not receive the technical information about the error, the user simply gets a generic error message.

Finally, as illustrated in block 110, the process is completed by requiring the user to re-start the entity application activity or contact an entity associate associated with the entity application for resolution of the error.

Figure 3A:
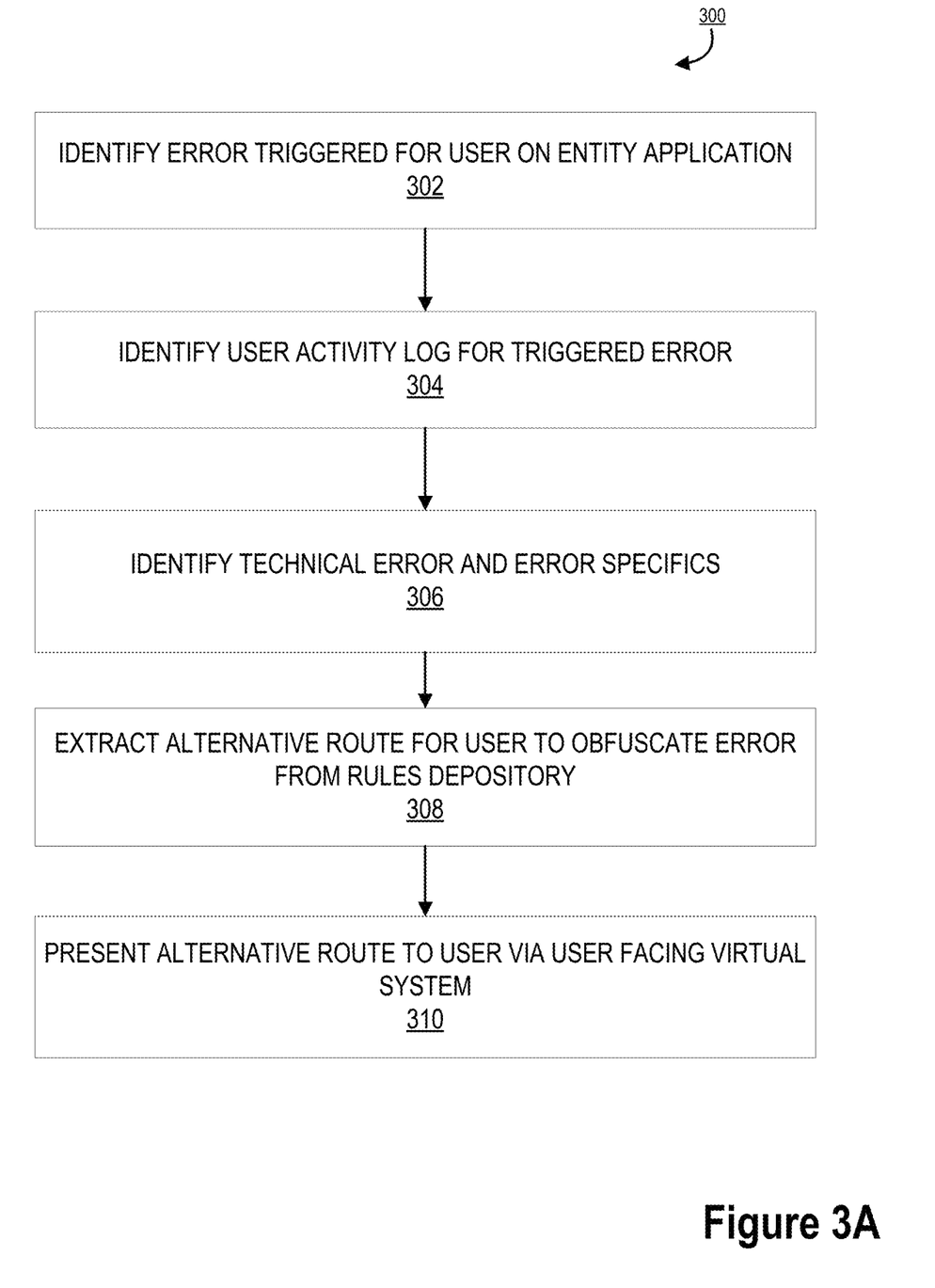
FIG. 3A provides a process flow for implementation and deployment of the deciphering and unblocking system, in accordance with one embodiment of the present invention.

FIG. 3A provides a process flow for implementation and deployment of the deciphering and unblocking system, 300 in accordance with one embodiment of the present invention. As illustrated in block 302, the process 300 is initiated by identifying an error triggered for a user while the user is active on an entity application. These activities could be shopping, trading, account reviewing, performing transactions, communicating, reviewing information, or the like on an entity application. The user may be performing these actions via a user device or other device connected to a network. The entity application maybe one or more software applications for display on a user device.

As illustrated in block 304, a technical error may be triggered during the user activity on the entity device. The technical error may be due to a business rule, an outage, a delay, an entity side server delay, a network issue, a user device issue, or another technical issue arising with the deployment and utilization of the entity application.

As illustrated in block 306, the process 300 continues by identifying the technical error and extract specifics about error. In this way, the system may identify the specific about the error. The specifics may be the location of the error, the technical aspects of the error, the code of the error, and the like.

Next, as illustrated in block 308, the process continues by extracting an alternative route for the user to obfuscate the error, wherein the alternative route is provided via the rules depository. In some embodiments, the alternative route may be a way to fix the error, a work around to continue user action, a circumvention of the error, or the like allowing the user to continue his/her action on the entity application. Finally, as illustrated in block 310 the process 300 is completed by presenting the alternative route and instructions for completing the alternative route to the user via the user facing virtual system.

Figure 3B:
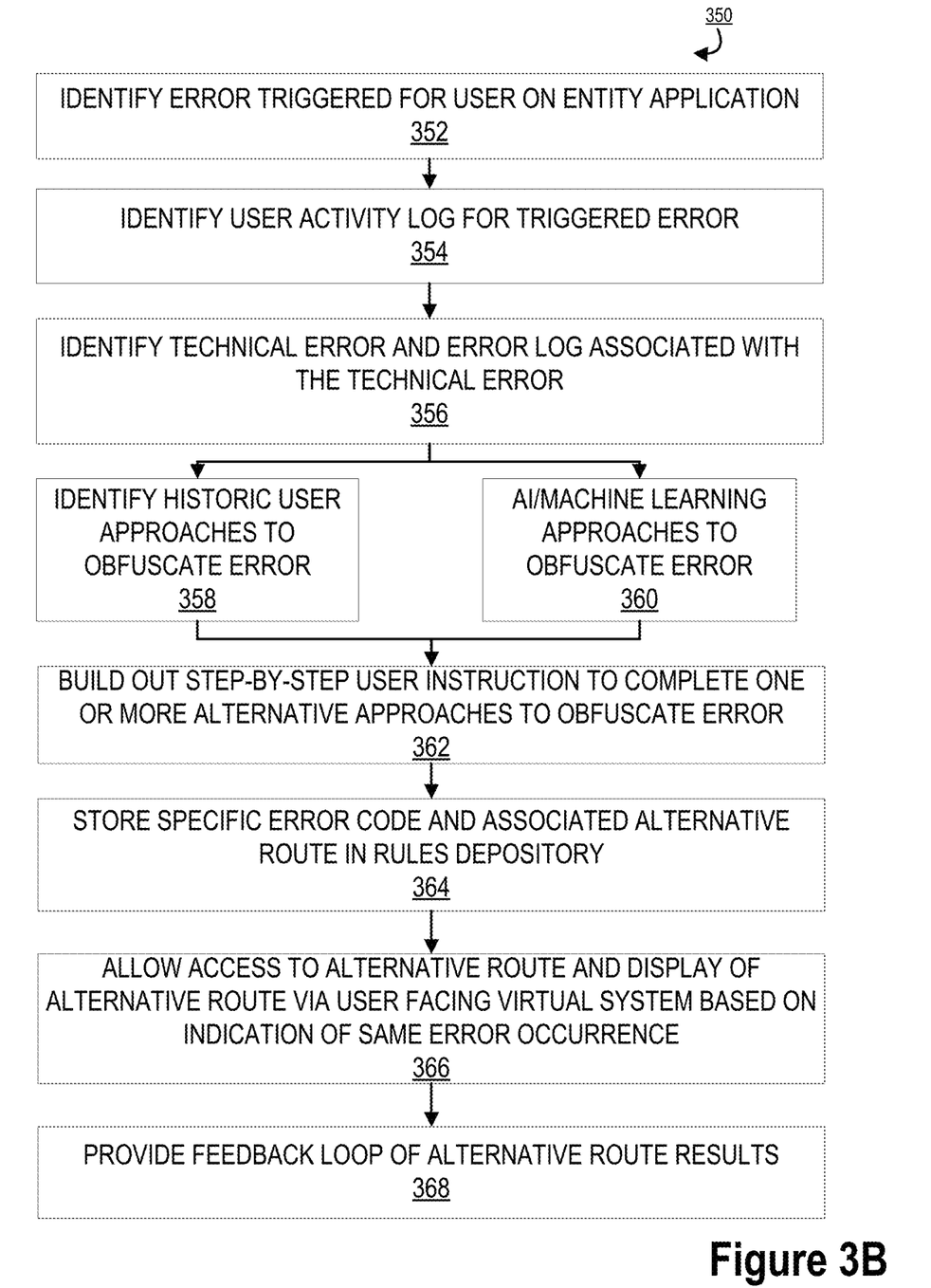
FIG. 3B provides a process flow for implementation and deployment of the deciphering and unblocking system, in accordance with one embodiment of the present invention.

FIG. 3B provides a process flow for implementation and deployment of the deciphering and unblocking system 350, in accordance with one embodiment of the present invention. As illustrated in block 352, the process 350 is initiated by identifying an error being triggered for the user on an entity application. In this way, the system identifies that an error has been initiated and/or was deployed to a user via a user device while the user is performing actions via an entity application. The system provides a drop in multi-channel tool that executes on the top of an underlying cloud base analytic rule engine.

As illustrated in block 354, the process 350 continues by the decipher and execution system identification of the user activity log for the triggered error. In this way, the system may identify what location the user was navigation within the entity application, what operations the user was performing prior to the error occurrence, or the like. As such, the system may be able to identify the user actions and user location within the entity application prior to the error occurrence.

Next, as illustrated in block 356, the process 350 continues by executing on top of an underlying entity application and identifying the technical error and error log associated with the technical error. The system identifies the technical error based on backend monitoring and identification of the technical coding and rational for the error being triggered.

Once the error type and technical data associated with the error is identified and extracted, the system may work to obfuscate the error for the user. In some embodiments, the system may extract rules for obfuscation of the error from the rules depository. The rules depository may store step by step rules for obfuscation of all identified errors associated with the specific entity application. As illustrated in block 358, the system may identify historic user approaches to obfuscate the error. In this way, the system may identify various historic actions performed by users or associates of the entity in order to rectify the error. In some embodiments, the error fix may be identified by a previous user facing the error. In other embodiments, associates associated with the entity application may identify errors and error correction rules. The rules depository may then extract these rules and store step by step instructions for performing the rules in order to overcome the error. As illustrated in block 360, the system may perform artificial intelligence and machine learning approaches to obfuscate the error. In this way, the system may continually perform artificial intelligence and machine learning on entity applications as they are running in order to identify errors, identify technical aspects of those errors, and identify rules for overcoming the error.

Next, as illustrated in block 362, the process 350 continues by building out step by step user instructions to complete one or more alternative approaches to obfuscate the error. In this way, once the error has been identified, the system may learn the step by step instructions for completing a work around, fix, or other obfuscation of the error for the user to complete the actions the user was performing on the entity application.

As illustrated in block 364, the process 350 continues by storing the specific error code and associated alternative route in the rules depository. In this way, the system may store the step by step alternative route for error obfuscation in the rules depository. Once stored, the alternative route may be accessible by the system upon an identification of the error that matches the alternative route occurring for a user during user activity on the entity application. As illustrated in block 366, the process 350 continues by allowing access to the alternative route and displaying the alternative route via a user facing virtual system based on an indication of the an error occurrence. As such, the user may be able to follow step by step instructions presented to the user on the user device via the user facing virtual system. The user facing virtual system may present these instructions via text, audible, virtually, or the like. The user may be able to follow these instructions in order to obfuscate the error presented to the user while the user is performing actions on the entity application, allowing the user to continue, in real-time, to perform the actions on the entity application after the error obfuscation steps are performed for alternate route.

As illustrated in block 368, the process 350 is completed by providing a feedback loop for identification of how effective the alternative route for rule obfuscation was for the user. The system then feeds that data back into the artificial intelligence and machine learning systems for modification of the alternate route for deployment to another user the next time the specific error is presented.

Figure 4:
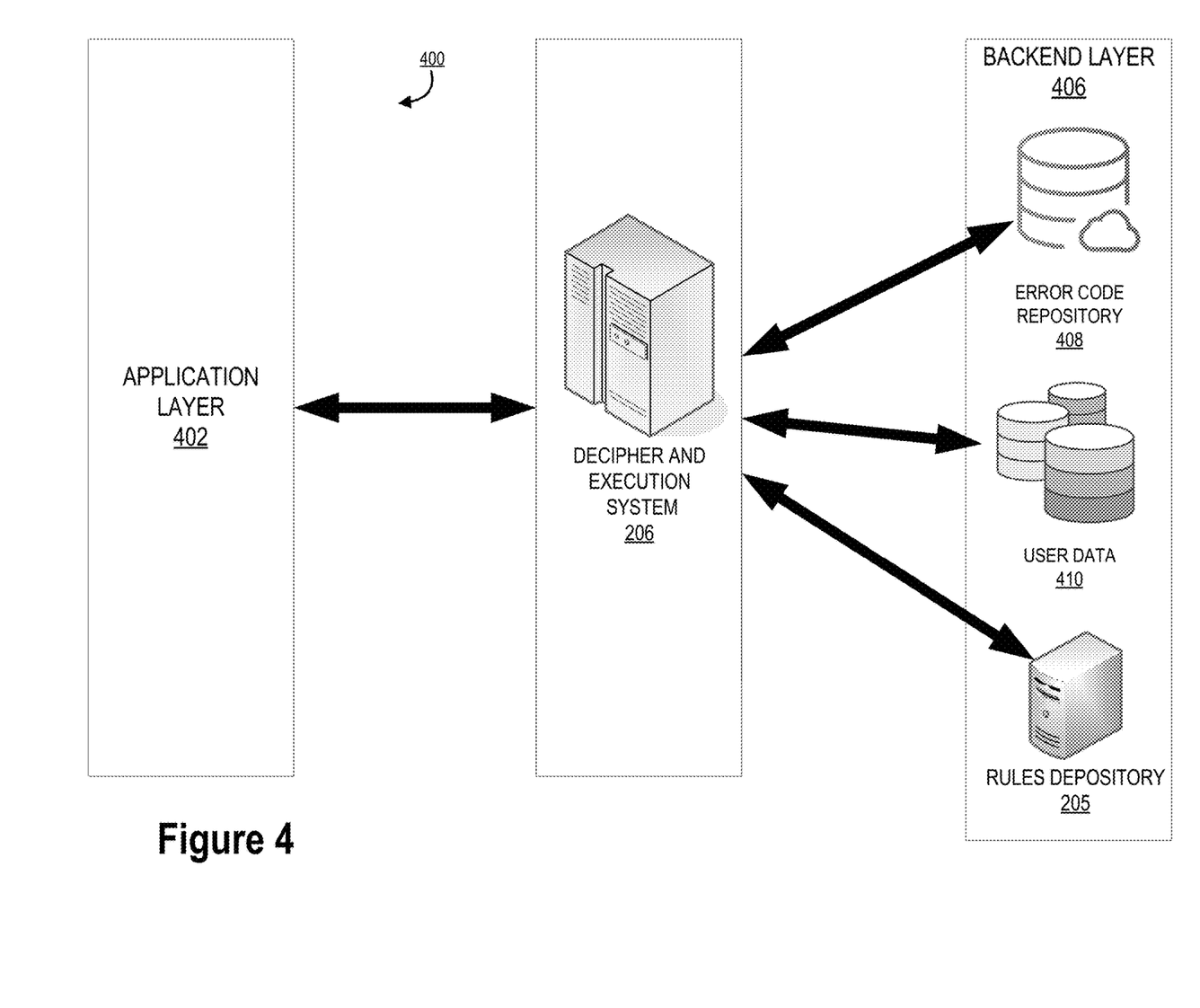
FIG. 4 provides an implementation flow for deciphering and unblocking system process deployment, in accordance with one embodiment of the present invention.

FIG. 4 provides an implementation flow for deciphering and unblocking system process deployment 400, in accordance with one embodiment of the present invention. As illustrated, FIG. 4 presents an implementation flow for implementation of the deciphering and unblocking system environment.

As illustrated, the decipher and execution system 206 is integrating into the middle of the process 400, which business services layer and rules execution engine. The application layer 402 is displayed on the user device and is the location and layer within the application that the user is within the entity application. In this way, the user may be accessing one or more portions of the entity application and/or various layers associated with the same.

Next, as illustrated on the right side of the implementation flow process 400 provides the backend layer 406 associated with the decipher and execution system 206. The backend layer 406 may be associated with or part of the decipher and execution system 206. The backend layer 406 may comprise an error code repository 408. The error code repository 408 may be associated with the decipher and execution system 206 and/or the rules depository 205. The error code repository 408 may identify the codes associated with each error message to identify the specific error associated with the message. In this way, the system may be able to identify the specific technical error associated with the error message received by the user. The backend layer 406 may also comprise user data 410. The user data 410 may comprise a log of the user activity on the entity application in order to understand what the user has done on the entity application and/or what the user has tried for error reconciliation. Furthermore, the backend layer 406 may further include the rules depository 205. As mentioned, in some embodiments, the error code repository 408 and the user data storage 410 may be associated with or integrated into the rules depository 205.

Figure 5:
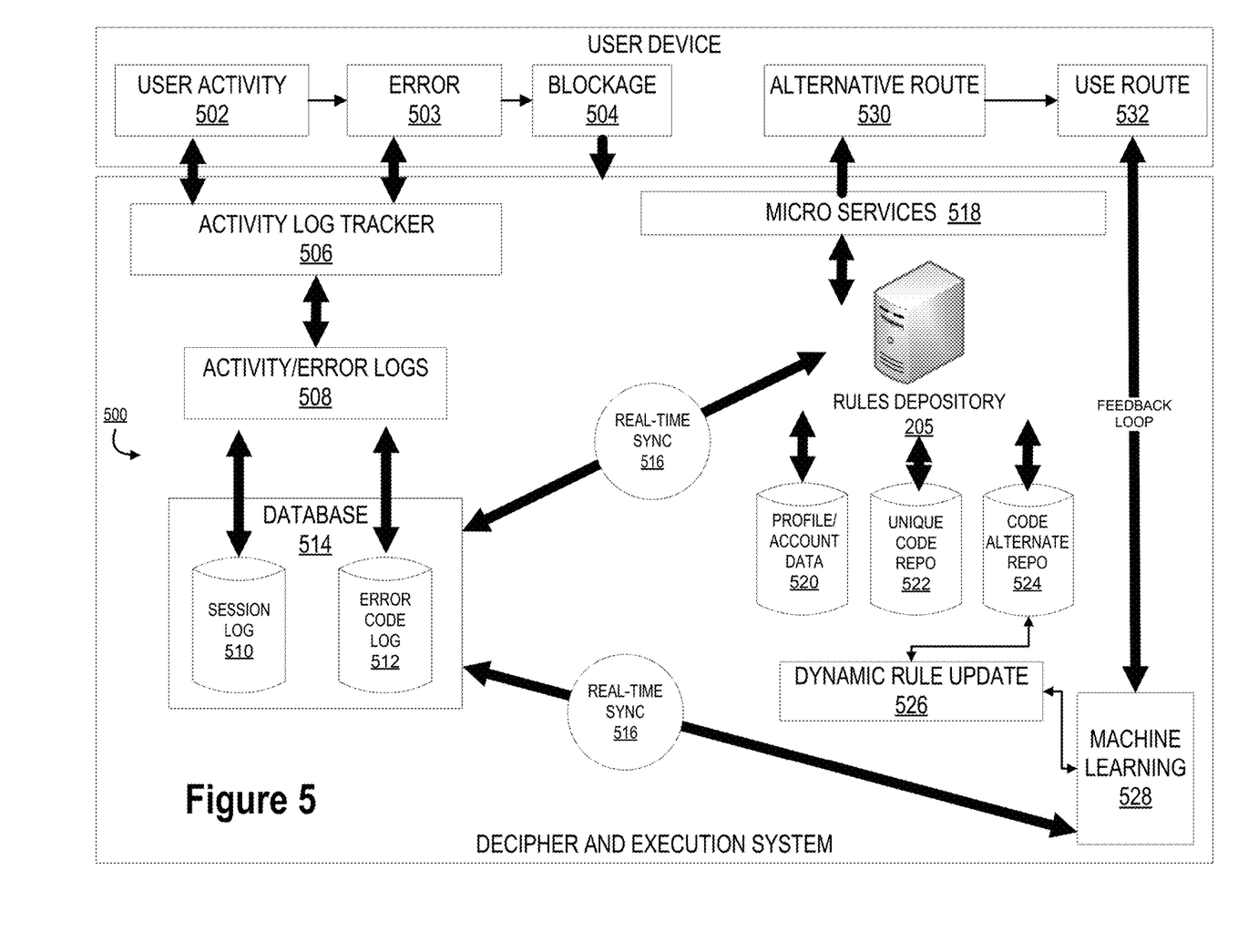
FIG. 5 provides a process flow for user system interaction for error deciphering and unblocking, in accordance with one embodiment of the present invention.

FIG. 5 provides a process flow for user system interaction for error deciphering and unblocking 500, in accordance with one embodiment of the present invention. As illustrated, the process 500 may take place on a user device or the decipher and execution system in combination with the rules depository. The process 500 is initiated by identifying user activity on an entity application, as illustrated in block 502. During the user activity, the user may receive an error message, as illustrated in block 503. Currently, without the system being deployed, the user would be blocked from performing and additional activities on the entity application. As such, the user would need to stop performing the activity on the entity application and requiring the user to re-start his/her activity.

However, utilizing the system described herein, upon the user activity 502 and error 503, the system may perform a tracking of the user's activity on the entity application. As illustrated in block 506, the decipher and execution system may perform activity log tracker to log the activity of the user to identify the user actions that caused the error and to identify if the user has performed any additional actions to obfuscate the error on his/her own. As illustrated in block 508, system may continue the process 500 by logging the activity and the error.

Next, as illustrated in block 514, the error is processed through a database that includes a session log 510 and an error code log 512. The database 514 is continually synchronized via real-time synchronization bots 516 by data within the rules depository 205 and machine learning systems 528.

Once the error has been triggered, the rules depository 205 utilizing account data 520, unique code repository 522, and code alternate route repository 524 may identify the appropriate alternative route for the user. In some embodiments, account data 520 comprises account data associated with the user performing the activity. In this way, the system may identify the user history and user activity on the entity application and other user history with the entity. In some embodiments, unique code repository 522 identifies the codes that are associated with errors that occur within the entity application. In this way, the system may identify each code associated with the error, so that the system may be able to match the error code to identify the alternative route. In some embodiments, code alternate route repository 524 may include step by step process for the user to complete the alternative steps to obfuscate the error in real-time.

The micro services 518 may further be used to process the error, match the error log of the current error to an alterative route, and present the alternative route. The micro services are further illustrated below with respect to FIG. 6.

As illustrated in block 530, the decipher and execution system may present an alternative route to the user via the user device. The alternative route presentation may be presented to the user via the user device by the user facing virtual system. The alternative route may present specific step by step instructions for error obfuscation. The user may then utilize the route, as illustrated in block 532.

Finally, a feedback loop is provided back to the machine learning engine 528. The machine learning engine 528 continually modifies and performs a dynamic rule update for the rules depository, as illustrated in block 526.

Figure 6:
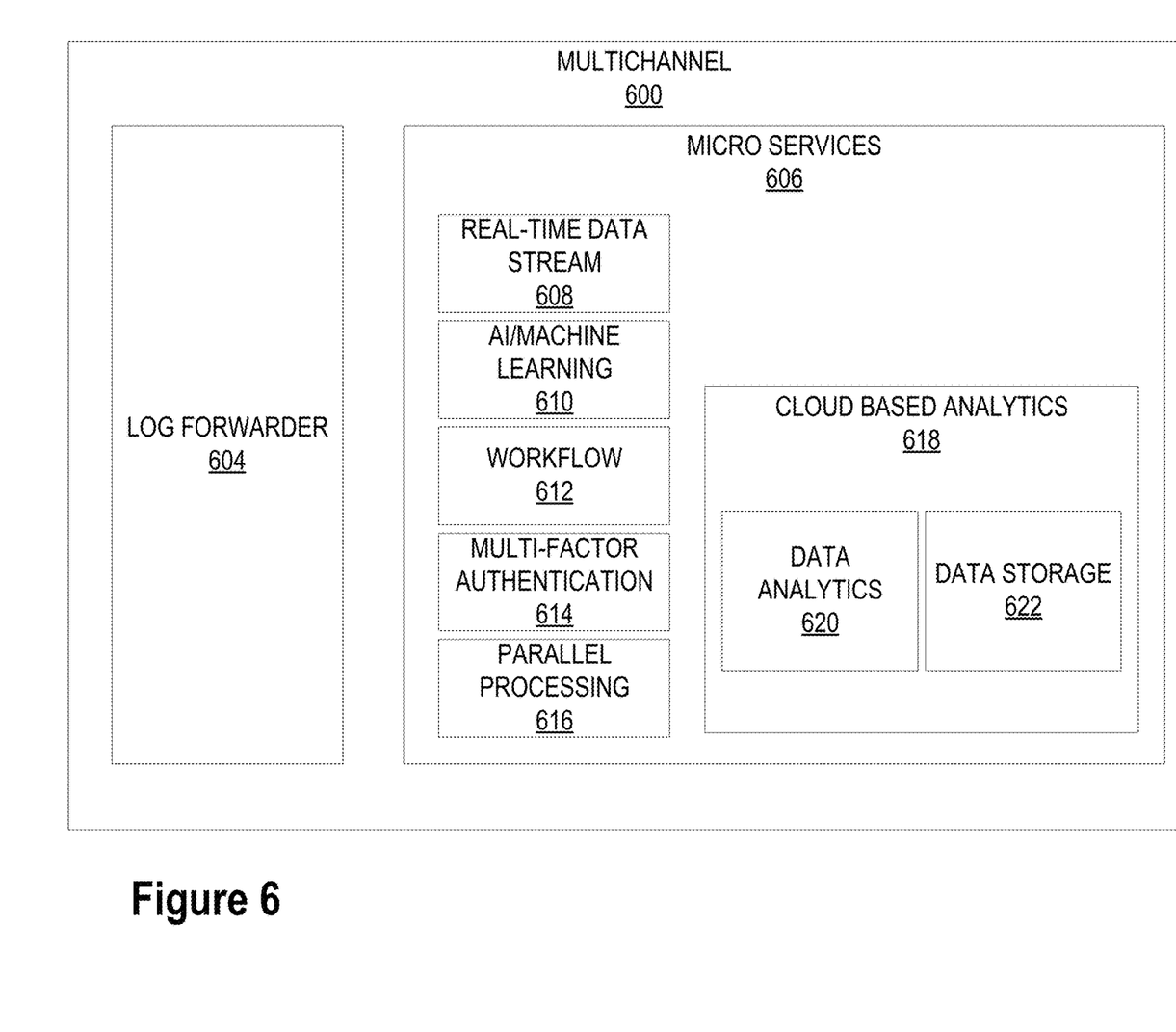
FIG. 6 provides a process flow illustrating a multichannel interactions for error deciphering and unblocking, in accordance with one embodiment of the present invention.

FIG. 6 provides a process flow illustrating a multichannel interactions for error deciphering and unblocking, in accordance with one embodiment of the present invention. As illustrated, FIG. 6 provides a multichannel technology stack 600. As illustrated, the multichannel technology stack 600 comprises micro services 606 and a log forwarder 604. The log forwarder 604 provides a log of each action of the user on the entity application and logs of each error presented on the entity application. The log forwarder 604 compiles the logs and forwards them to the necessary systems in compiled data stacks for the system to utilize for analysis.

As illustrated, the multichannel data stack 600 includes micro services 606. The micro services 606 comprise a real-time data stream service 608, artificial intelligence and machine learning service 610, a workflow service 612, a multi-factor authentication service 614, and a parallel processing service 616.

In some embodiments, the real-time data stream service 608 provides for a real-time data synchronization for the system. In some embodiments, the artificial intelligence and machine learning service 610 builds rules based on user behavior and preferences and further caches preferred rules for quick turnaround of error obfuscation. In some embodiments, the workflow service 612 provides for decision making for the system network. In some embodiments, the multi-factor authentication service 614 provides authentication for the user and system. In some embodiments, the parallel processing service 616 comprises an improved performance for error processing.

Furthermore, as illustrated, the multichannel data stack 600 includes micro services 606 that include cloud based analytics 618. Cloud based analytics 618 is a hosting platform for data analytics 620 and data storage 622. In some embodiments, the data analytics 620 comprises an analytics platform for finding preferred patterning to build out custom rules and alternative routing.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for deciphering and unblocking of applications, the system comprising:
   a memory device with computer-readable program code stored thereon;
   a communication device, wherein the communication device is configured to establish operative communication with a plurality of networked devices via a communication network;
   a processing device operatively coupled to the memory device and the communication device, wherein the processing device is configured to execute the computer-readable program code to:
      identify an error presentation to a user while the user is performing an action on an entity application, wherein the error presentation is an indication of a technical error occurring and wherein the error presentation is presented to the user via a user device;

identify the technical error associated with the error presentation;

analyze user historic actions performed when the technical error was triggered to identify a technical error obfuscation;

extract an alternative approach from a rules depository that matches the technical error associated with the error presentation, wherein the alternative approach is generated via machine learning applied to the user historic actions, generating instructions and step by step instructions for completing a work around;

transmit the extracted alternative approach to a user facing virtual system, wherein the user facing virtual system comprises accessing the user device and displaying audibly and virtually the step by step instructions for completing the work around;

display the alternative approach to the user via invasion and display on the user device; and provide real-time step by step processing to the user via the alternative approach for error obfuscation in real-time during the action on the entity application.

2. The system of claim 1, further comprising a drop in multi-channel tool that executes on top of an underlying cloud base analytic rule engine for providing the alternative approach for error obfuscation.

3. The system of claim 1, wherein the rules depository further comprises a searchable inventory of step by step alternative approaches for each technical error associated with the entity application.

4. The system of claim 1, wherein the alternative routes are generated based on artificial intelligence and machine learning that identifies potential technical errors and the alternative approaches are generated based on entity and user historic actions performed when faced with the error presentation.

5. The system of claim 1, wherein identifying the error presentation further comprises extracting an error log associated with the technical error and extracting a user activity log leading up to the error presentation to the user.

6. The system of claim 1, wherein identifying the error presentation further comprises identifying a generic error presentation and performing back end processing analysis to identify a technical rationale for the error to further identify the technical error associated with the generic error presentation.

7. A computer program product for deciphering and unblocking of applications, the computer program product comprising at least one non-transitory computer-readable medium having computer-readable program code portions embodied therein, the computer-readable program code portions comprising:

an executable portion configured for identifying an error presentation to a user while the user is performing an action on an entity application, wherein the error presentation is an indication of a technical error occurring and wherein the error presentation is presented to the user via a user device;

an executable portion configured for identifying the technical error associated with the error presentation;

an executable portion configured for analyzing user historic actions performed when the technical error was triggered to identify a technical error obfuscation;

an executable portion configured for extracting an alternative approach from the rules depository that matches the technical error associated with the error presentation, wherein the alternative approach is generated via machine learning applied to the user historic actions, generating instructions and step by step instructions for completing a work around;

an executable portion configured for transmitting the extracted alternative approach to a user facing virtual system, wherein the user facing virtual system comprises accessing the user device and displaying audibly and virtually the step by step instructions for completing the work around;

an executable portion configured for displaying the alternative approach to the user via a display on the user device; and an executable portion configured for providing real-time step by step processing to the user via the alternative approach for error obfuscation during the action on the entity application.

8. The computer program product of claim 7, further comprising an executable portion configured for a drop in multi-channel tool that executes on top of an underlying cloud base analytic rule engine for providing the alternative approach for error obfuscation.

9. The computer program product of claim 7, wherein the rules depository further comprises a searchable inventory of step by step alternative approaches for each technical error associated with the entity application.

10. The computer program product of claim 7, wherein the alternative routes are generated based on artificial intelligence and machine learning that identifies potential technical errors and the alternative approaches are generated based on entity and user historic actions performed when faced with the error presentation.

11. The computer program product of claim 7, wherein identifying the error presentation further comprises extracting an error log associated with the technical error and extracting a user activity log leading up to the error presentation to the user.

12. The computer program product of claim 7, wherein identifying the error presentation further comprises identifying a generic error presentation and performing back end processing analysis to identify a technical rationale for the error to further identify the technical error associated with the generic error presentation.

13. A computer-implemented method for deciphering and unblocking of applications, the method comprising:

providing a computing system comprising a computer processing device and a non-transitory computer readable medium, where the computer readable medium comprises configured computer program instruction code, such that when said instruction code is operated by said computer processing device, said computer processing device performs the following operations:

identifying an error presentation to a user while the user is performing an action on an entity application, wherein the error presentation is an indication of a technical error occurring and wherein the error presentation is presented to the user via a user device;

identifying the technical error associated with the error presentation;

analyzing user historic actions performed when the technical error was triggered to identify a technical error obfuscation;

extracting an alternative approach from a rules depository that matches the technical error associated with the error presentation, wherein the alternative approach is generated via machine learning applied to the user historic actions, generating instructions and step by step instructions for completing a work around;

transmitting the extracted alternative approach to a user facing virtual system, wherein the user facing virtual system comprises accessing the user device and displaying audibly and virtually the step by step instructions for completing the work around;

displaying the alternative approach to the user via a display on the user device; and providing real-time step by step processing to the user via the alternative approach for error obfuscation during the action on the entity application.

14. The computer-implemented method of claim 13, further comprising a drop in multi-channel tool that executes on top of an underlying cloud base analytic rule engine for providing the alternative approach for error obfuscation.

15. The computer-implemented method of claim 13, wherein the rules depository further comprises a searchable inventory of step by step alternative approaches for each technical error associated with the entity application.

16. The computer-implemented method of claim 13, wherein the alternative routes are generated based on artificial intelligence and machine learning that identifies potential technical errors and the alternative approaches are generated based on entity and user historic actions performed when faced with the error presentation.

17. The computer-implemented method of claim 13, wherein identifying the error presentation further comprises extracting an error log associated with the technical error and extracting a user activity log leading up to the error presentation to the user.

18. The computer-implemented method of claim 13, wherein identifying the error presentation further comprises identifying a generic error presentation and performing back end processing analysis to identify a technical rationale for the error to further identify the technical error associated with the generic error presentation.

* * * * *